Sept. 28, 1926.
C. WOLFE
SEAT FOR WINDOW WASHERS
Filed March 11, 1925
1,601,279
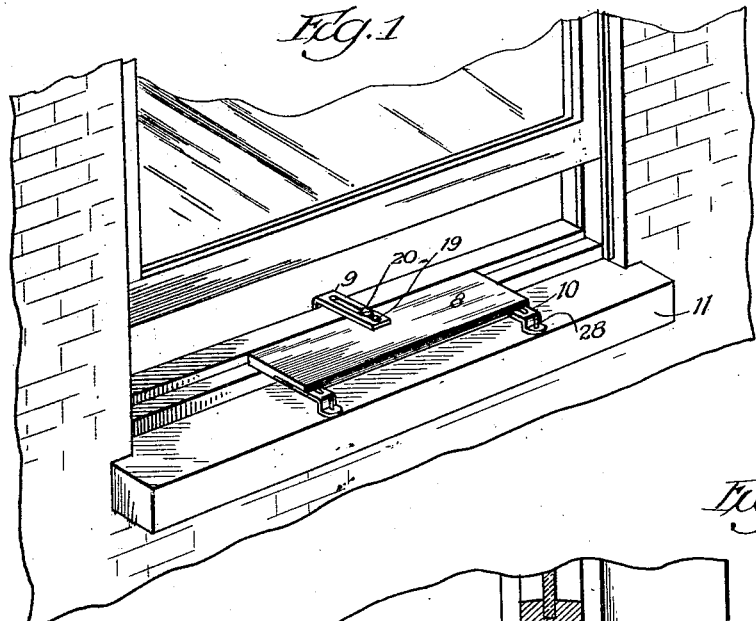
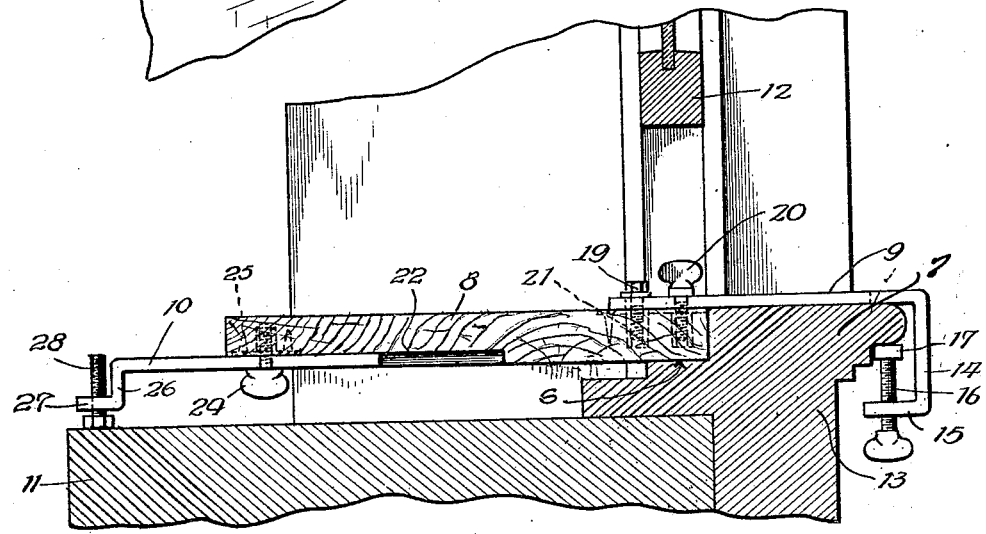
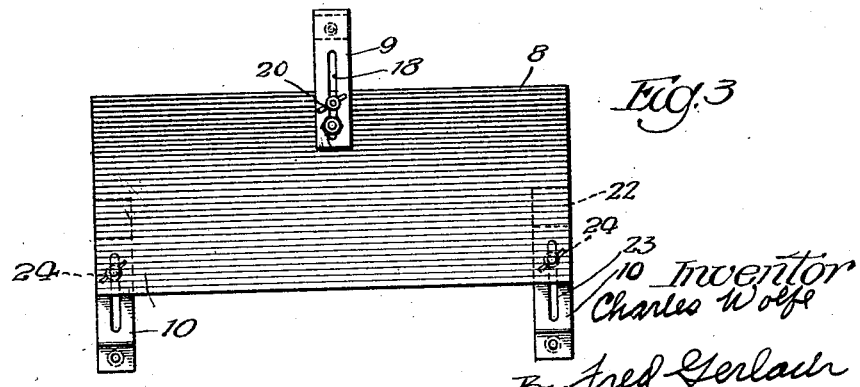
Inventor
Charles Wolfe
By Fred Gerlach
his Atty.

Patented Sept. 28, 1926.

1,601,279

UNITED STATES PATENT OFFICE.

CHARLES WOLFE, OF CHICAGO, ILLINOIS.

SEAT FOR WINDOW WASHERS.

Application filed March 11, 1925. Serial No. 14,603.

The invention relates to seats for window washers.

One object of the invention is to provide a seat of new and improved construction in which provision is made for adjustment so that the seat may be secured to windows of different sizes.

Another object of the invention is to provide a seat which is adapted to be supported on its inner end by the window-frame and at its outer end by a plurality of arms which project beyond the seat and which are supported by the window sill.

A still further object of the invention is to provide a window-washers seat which is simple in construction and which may be produced at a low cost.

The invention consists in the several novel features hereinafter set forth and more particularly defined by the claim at the conclusion hereof.

In the drawings: Fig. 1 is a perspective of the lower portion of a window with the invention attached in operative position to the frame and sill thereof. Fig. 2 is formed to terminate outside of the stool 7 of the window-frame 13 and is a side elevation of the invention, the window-sill and frame to which it is secured, being shown in section. Fig. 3 is a plan view.

The invention is exemplified in a seat for window-washers which comprises a seat member 8 made of wood or any other suitable material, an arm 9 slidably connected to the inner end of said seat, and a pair of supporting arms or members 10 slidably connected to the outer end of said seat and adjustably supported on the sill 11 of a window. The inner end of seat 8 is adapted to rest directly upon and be supported by the ledge 6 of the window-frame against which the lower part of the window-sash 12 rests when it is in its lowered and normal position. Seat 8 is held in its operative position by arm 9 which extends over the upper surface of said stool 7 and is provided at its outer end with a depending portion 14 and an inwardly extending portion 15 forming a hook which is adapted to extend around and under the window-frame 13. A thumb screw 16 is screw-threaded to portion 15 and has its upper end provided with a lug 17 which is adapted to engage the under surface of the frame, as shown in Fig. 2, to clamp arm 9 in its assigned position. Arm 9 is provided with a longitudinally extending slot 18 and is adjustably secured to the upper surface of seat 8 by a thumb screw 20 which extends transversely through the slot and which is screw-threaded to a metallic plate 21 secured and imbedded in the upper surface of said seat 8. A bolt 19 extends transversely through said slot 18 so as to additionally secure arm 9 to the seat. By means of this slot and screw connection, arm 9 may be moved laterally with respect to seat 8 and readily adjusted to windowframes of different widths.

Supporting arms 10 which support the outer end of seat 8 are slidably mounted in grooves 22 which are formed on the under side of said seat. Each arm is provided with a longitudinally extending slot 23 and is adjustably secured in groove 22 by a thumb screw 24 which is screw-threaded to a metallic plate 25 which is suitably imbedded in and secured to the under surface of said seat 8. The outer ends of the arms 10 project outwardly beyond seat 8 and are bent downwardly to form portions 26 and outwardly to form portions 27. Bolts 28 are screw-threaded to the portions 27 and are adapted to adjustably support the supporting arms on the window sill 11. By means of the slot and thumb screw connection, the supporting arms 10 may be adjusted laterally with respect to the seat 8 so that the arms may be readily supported upon window sills of different widths. By means of bolts 28 these arms may be adjusted vertically so that the seat may be raised or lowered, or the arms may be adjusted to any window sills, the heighth of which may vary in relation to the window frame.

By supporting the seat at its inner end directly upon the window-frame and at its outer end by a plurality of arms which project beyond the rear end of the seat, the pressure and weight of a person sitting thereon will be evenly distributed upon the window-sill and frame, and in such a manner that there will be no strain upon the arm 9.

The invention exemplifies a seat for window-washers which may be used with safety and which is adjustable so that it may be applied to windows of different sizes.

The invention is not to be understood as restricted to the details set forth, since these may be modified within the scope of the appended claim, without departing from the spirit and scope of the invention.

Having thus described the invention, what I claim as new and desire to secure by Letters Patent, is:

A window seat comprising a substantially flat seat member having its inner end adapted to rest directly upon a ledge of a window-frame and its outer end terminating inwardly of the outer edge of the window-sill, an arm for securing the inner end of the member in its operative position, said arm having its inner end adjustably connected to the top surface of the member and its outer end shaped to form a hook, said member having a pair of horizontal grooves cut in the under surface thereof, a pair of arms adjustably mounted in the grooves and having their outer ends extending outwardly of the outer end of the member and bent downwardly and outwardly to form supports, and bolts extending through the outwardly extending portions of the supports and adapted to rest upon said window-sill, for vertically adjusting the supports.

Signed at Chicago, Illinois this 8th day of March, 1925.

CHARLES WOLFE.